United States Patent
Reno et al.

(10) Patent No.: US 10,761,871 B2
(45) Date of Patent: Sep. 1, 2020

(54) METHOD AND APPARRATUS FOR SECRETS INJECTION INTO CONTAINERS

(71) Applicant: Telefonaktiebolaget LM Ericsson (publ), Stockholm (SE)

(72) Inventors: James Donald Reno, Scotts Valley, CA (US); Michael Brown, Fremont, CA (US); Akshay Rajesh Baheti, San Jose, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 114 days.

(21) Appl. No.: 15/813,016

(22) Filed: Nov. 14, 2017

(65) Prior Publication Data
US 2019/0146816 A1 May 16, 2019

(51) Int. Cl.
| | |
|---|---|
| G06F 9/455 | (2018.01) |
| G06F 21/00 | (2013.01) |
| G06F 21/10 | (2013.01) |
| G06F 21/30 | (2013.01) |
| G06F 21/62 | (2013.01) |
| G06F 21/53 | (2013.01) |
| G06F 21/44 | (2013.01) |
| G06F 21/12 | (2013.01) |

(52) U.S. Cl.
CPC .......... *G06F 9/45558* (2013.01); *G06F 9/455* (2013.01); *G06F 9/45504* (2013.01); *G06F 9/45508* (2013.01); *G06F 9/45529* (2013.01); *G06F 9/45533* (2013.01); *G06F 21/00* (2013.01); *G06F 21/10* (2013.01); *G06F 21/12* (2013.01); *G06F 21/121* (2013.01); *G06F 21/30* (2013.01); *G06F 21/445* (2013.01); *G06F 21/53* (2013.01); *G06F 21/6218* (2013.01); *G06F 2009/45587* (2013.01)

(58) Field of Classification Search
CPC .. G06F 9/455; G06F 9/45504; G06F 9/45533; G06F 9/45558; G06F 9/45587; G06F 21/00; G06F 21/10; G06F 21/12; G06F 21/121; G06F 21/30; G06F 21/445
See application file for complete search history.

(56) References Cited

U.S. PATENT DOCUMENTS

| | | | |
|---|---|---|---|
| 2015/0379287 A1 | 12/2015 | Mathur et al. | |
| 2016/0219073 A1* | 7/2016 | Mathur | G06F 21/53 |
| 2016/0342786 A1* | 11/2016 | Gerebe | G06F 21/52 |
| 2016/0381075 A1* | 12/2016 | Goyal | H04L 63/20 |
| | | | 713/176 |
| 2017/0116415 A1* | 4/2017 | Stopel | G06F 21/554 |
| 2017/0177877 A1* | 6/2017 | Suarez | G06F 16/188 |
| 2017/0277524 A1* | 9/2017 | Bhat | G06F 8/60 |
| 2017/0279797 A1 | 9/2017 | Cross, Jr. et al. | |
| 2018/0088993 A1* | 3/2018 | Gerdesmeier | G06F 9/5005 |
| 2018/0144123 A1* | 5/2018 | Levin | G06F 21/53 |
| 2018/0196654 A1* | 7/2018 | Bo | G06F 9/455 |

(Continued)

*Primary Examiner* — Charles M Swift
(74) *Attorney, Agent, or Firm* — NDWE, LLP

(57) ABSTRACT

A method and system for managing dynamic runtime information provision for containers in a container management system. The method includes starting a container image load, determining whether a secret sub unit is present in the container image, determining secret value input source and destination of secret value, and providing secret values to destination sub unit of a container defined by the container image.

20 Claims, 4 Drawing Sheets

(56) References Cited

U.S. PATENT DOCUMENTS

| | | | |
|---|---|---|---|
| 2018/0196680 A1* | 7/2018 | Wang | G06F 8/63 |
| 2018/0285156 A1* | 10/2018 | Corey | G06F 9/5005 |
| 2018/0357068 A1* | 12/2018 | Ambichl | G06F 9/445 |
| 2018/0359239 A1* | 12/2018 | Schwarz | H04L 63/083 |
| 2019/0028490 A1* | 1/2019 | Chen | H04L 63/1416 |

* cited by examiner

METHOD AND APPARRATUS FOR SECRETS INJECTION INTO CONTAINERS

TECHNICAL FIELD

Embodiments of the invention relate to the field of virtualization using containers; and more specifically, to a process for container management where there is provisioning for secrets during container instantiation.

BACKGROUND

A platform is an operating environment that may execute on physical and/or virtualized hosts. A physical host is a traditional computing system having physical hardware and an operating system. Virtual hosts are operating environments based on the virtualization of the physical hardware. Virtualization in the area of computing systems is the creation of a virtual (rather than physical) representation of some aspect of the computing system. Operating system level virtualization is an example of virtualization where a server is virtualized often to provide more secure hosting environments in server farms, datacenters, cloud computing or similar distributed computing systems. Operating system level virtualization can securely manage fixed physical computing system resources amongst a set of users. These users may be from competing entities and thus need to have secured execution environments to prevent the other users from gaining access to our interfering with their programs.

A platform can be used to manage a set of separate operating environments as containers, virtualization engines or similar instances. The platform manages the physical computing system resources amongst the set of operating environments. The management of resources can be referred to as a virtualization system. The virtualization system may support a container management system, which is a type of virtualization system that is lightweight (i.e., requires less computational and storage overhead) in comparison to other types of virtualization. The container management system enables any number of containers or similar entities to execute over any number of physical or virtual hosts as part of the platform. These containers are generated from container images, which are a format for defining code that will execute in the container.

Applications running on the platform are executed within containers or similar entities managed by the platform. The containers are a mechanism where applications can be controlled to limit the amount of computing resources utilized by the application during execution. The containers are isolated and controlled lightweight processes running on an operating system or hypervisor. The operating system may be implemented by a physical or virtual host. The containers and the applications they run do not have access to any information about other processes of the host. A container is restricted to a limited set of resources including processor(s), memory, fixed storage and similar resources. The container may be allotted a fixed set of such resources when it is instantiated.

The use of containers provides advantages for running application. The containers can share runtime code with their host operating system and other containers. This makes the containers lightweight (i.e., low resource) and portable such that a large number of containers can run across many hosts as a distributed system and the containers can be moved between hosts for load balancing of the available resources across the set of hosts. However, such distribution and movement of containers across a set of hosts makes the monitoring of the condition and life cycle of the containers more difficult.

The platforms manage and monitor the containers in this distributed environment, which may include thousands of containers running across hundreds of physical and/or virtual hosts. To monitor the status of the containers the platforms and in particular the container management system of the platforms may use a centralized system where everything about the managed containers can be known. These systems load containers which are stored as images. The container images are composed of a number of sub units sometimes referred to as layers or packages that may contain executable code for operating systems, libraries, application programming interfaces (APIs), applications and similar aspects that are to form a container and that define its functionality.

SUMMARY

In one embodiment, a method of managing dynamic runtime information provision for containers in a container management system is presented. The method includes starting a container image load, determining whether a secret sub unit is present in the container image, determining secret value input source and destination of secret value, and providing secret values to destination sub unit of a container defined by the container image.

In another embodiment, a computing device is configured to implement the container management system. The container management system supports managing dynamic runtime information provision for containers. The computing device includes a non-transitory computer-readable medium having stored therein a container manager, and a processor coupled to the non-transitory computer-readable medium, the processor to execute the container manager, the container manager to start a container image load, to determine whether a secret sub unit is present in the container image, to determine secret value input source and destination of secret value and to provide secret values to destination sub unit of a container defined by the container image.

In a further embodiment, a non-transitory computer readable medium having stored therein a set of instructions is provided. When executed these instructions cause a computing device to perform a set of operations to support dynamic runtime configuration of containers in a container management system. The set of operations include starting a container image load, determining whether a secret sub unit is present in the container image, determining secret value input source and destination of secret value, and providing secret values to destination sub unit of a container defined by the container image.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
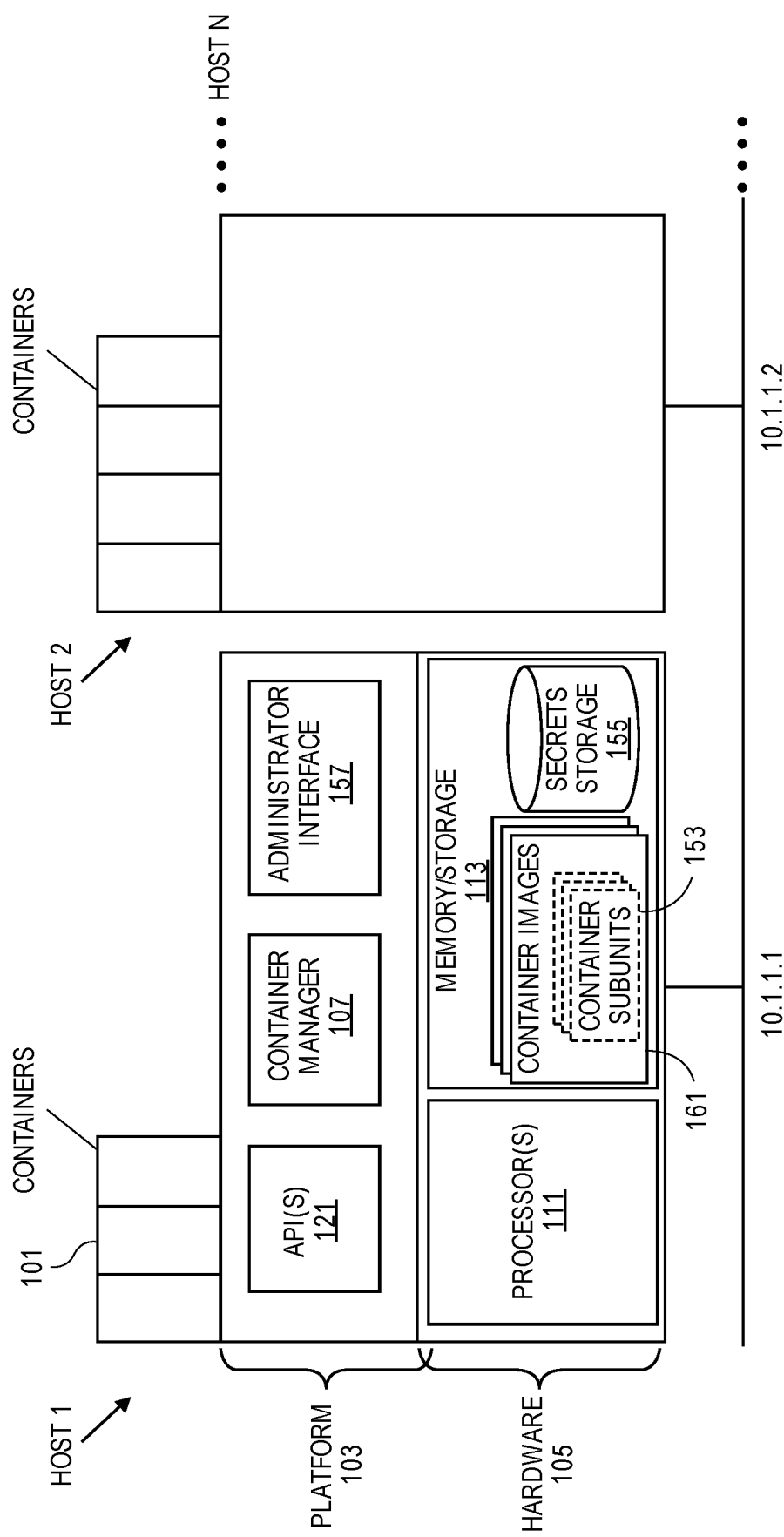
FIG. 1 is a diagram of one embodiment of a network of computing devices functioning as platform including a set of server hosts to manage a set of containers.

The following description describes methods and apparatus for managing the provisioning of secrets to containers that are constructed based on container images that include a secret sub unit where the secret sub unit defines the parameters for determining the requisite secret values at runtime. The embodiments enable dynamic provisioning of secrets whereby the security of the secrets is better maintained and they can be generated in a standardized manner at run time on a per instance basis.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device.

Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Overview

When running a platform that utilizes containers, some of these containers will require 'secrets' that are determined at runtime. These 'secrets' are data items such as cryptographic keys (e.g., private keys), passcodes or similar data that enables an instance of a container or a component of an instance of a container (e.g., an application) to have a unique secret that is distinct from other instances of the same container image. For example, a web server to be executed in a container may need a private key if it intends to serve transport layer security (TLS)-protected sessions. In other examples, an application running in a container that connects to a database might need a database password.

When the container image is being developed, the developer knows what secrets will be needed and how the container image will consume these secrets. For example, the developer will know that a private key is needed for a web server and that it must appear within the container in a certain file. However, the actual secret value (e.g., a private key value) for any given instance of the container image is not known until runtime, and will usually be different for every instantiation. Furthermore, unlike configuration data, secrets are sensitive and must be protected from unauthorized access. Thus, such secrets cannot form a part of the container image itself both for the dynamic per instance aspect and for the security of the information.

The existing processes for providing secrets to containers have various problems. These processes have security issues, complexity or inconvenience issues and a lack of standardization. The security issues require very careful implementation to avoid exposing the secrets. For example, environment variables related to a container can be unintentionally exposed to other processes within the platform. Also, the container images may not be securely stored, may be commonly available or publicly disseminated or similarly insecure. Thus, the container images cannot protect these secrets and the instantiation of container images does not have safeguards at the container management system to securely provide the secrets. The complexity and inconvenience of current processes involves a lack of automation. The knowledge of what secrets are needed, and how the container image expects these secrets to be provided at runtime is lost between development and operation (runtime.) Therefore, it must be transmitted "out of band." For example, this information must be communicated from developers to operations personnel. This introduces opportunity for errors.

The lack of standardization arises from the development of container images being performed by independent developers. Since there are different ways to inject secrets; different ways to present them; and no standards, the runtime container management system must be unnecessarily complex to handle any of the myriad implementations that developers may employ. The container management system must allow for any secret to be injected in any way to a container image to be instantiated. Operators must have knowledge of the correct approach for each container image. The runtime container management system cannot help the operator or simplify the process because it has no knowledge of the types of secrets each container image requires and the mechanism for their injection.

Container image files are composed of sub units that, when installed over each other, make up the runtime image of the container. In some embodiments, these sub units may be referred to as 'layers' (e.g., in the Docker container management system) or as 'packages' in other container management systems (e.g., the Apcera container management system). The embodiments define a special 'secrets' type of sub unit. These secrets sub units do not contain actual secret values. Rather, the secrets sub unit contain metadata about the secret values required at runtime for the associated container and how the secret values must be presented to container or a designated sub unit of the container.

At runtime (i.e., at the time that a container image is instantiated as a container by the container management system), rather than simply loading or layering the secrets sub unit into the container (as is done with other types of sub units), the container management system will obtain the actual secret values required by the container and arrange them in the container as directed by the metadata of the secrets sub unit. That arrangement might use any possible way to communicate information to the container or container sub unit.

The embodiments support each of the possible mechanisms for secret injection and provide an automated and standardized mechanism for their provision to the container image or container sub unit that requires the secret values. The secret sub unit can identify a place the secret values can be placed in the file system (e.g., on disk or in memory), in environment variables, as command parameters to the container image, or even specify a connection to a running container image using some form of inter-process communication (IPC) or protocol. Secret values can be extracted at runtime from some secret store (e.g., a file or database accessible to the container management system). The secret values can be entered by a user (e.g., by an operator) at the prompting of the container management system based on the defined metadata of the secret sub unit. The secret values can be generated dynamically (for example, a certificate generated or issued.) The secret metadata can enable the runtime container management system to intelligently manage and present the secrets to the operator.

The presence of the secrets sub unit metadata also enables fine-grained policy controls for further security on the secret values. For example, the secrets sub unit can limit certain users or certain jobs access to certain secret values. The secrets sub unit can use different secrets for development versus production jobs. Thus, the embodiments provide an approach that can be generalized for any kind of configuration data or dynamic (runtime-specific) data required by the container.

The embodiments overcome the limitations of the existing processes. The embodiments provide standardization of a basic required operations for running many container functions (e.g., injection of secret or dynamic/configuration data). The embodiments provide better security for the secrets being provisioned by supporting mechanisms for providing secret values without exposing these secret values. The embodiments provide a more robust administration of secret values and management of containers while reducing overall container management system overhead. The embodiments provide standardization and automation to reduce errors in secret provisioning caused by operators having insufficient information about the characteristics of the secret values or configuration data that are required by each container or container sub unit.

FIG. 1 is a diagram of one embodiment of a network of computing devices functioning as a platform including a set of server hosts to manage a set of containers. The FIG. 1 provides one example of a set of computing devices that implement a platform providing a container management system. In other embodiments, the platform may be implemented by a single computing device with any configuration of hardware, while in further embodiments, the components of the platform may be distributed in other combinations and permutations as would be understood by one of skill in the art. In the example embodiment, the computing devices (Host(s) 1-N) are connected with one another over a local area network in this example an L3 network. In other embodiments, the computing devices can be connected over any type of network, interconnect or communication system.

The computing devices (Host(1-N) can have similar or varied computing resources, including differing processing capabilities, storage capabilities and similar physical hardware differences. While the examples are primarily discussed in terms of physical computing devices serving as hosts, one skilled in the art would understand that additional levels of virtualization are possible such that the platform may execute on a set of virtual hosts. For sake of clarity, the hosts are discussed as physical computing devices.

Each of the computing devices includes hardware 105 comprising a set of one or more processor(s) 111 (which can be any type of general purpose of application specific processors), network interface controller(s) (NICs; also known as network interface cards) (which include physical and virtual interfaces), non-transitory machine-readable storage media 113 having stored therein software including the software that implements the embodiments described herein, and similar components. During operation, the processor(s) 111 execute the software to instantiate the platform 103 including any number of constituent components such as a container manager 103, application programming interfaces (APIs) 121, administrator interface 157 and similar components, as well as one or more sets of one or more applications. The embodiments may use different forms of virtualization. For example, in one embodiment the platform may encompass the kernel of an operating system (or a shim executing on a base operating system) that allows for the creation of multiple instances called software containers or simply 'containers' 101 as used herein that may each be used to execute one (or more) of the sets of applications supported by the platform, where the multiple containers 101 (also called virtualization engines, virtual private servers, or jails) are user spaces (typically a virtual memory space) that are separate from each other and separate from the kernel space in which the operating system is run; and where the set of applications running in a given container or user space, unless explicitly allowed, cannot access the memory of the other containers or processes.

In another embodiment, the platform encompasses a hypervisor (sometimes referred to as a virtual machine monitor (WM)) or a hypervisor executing on top of a host operating system, and each of the sets of applications is run on top of a guest operating system within an instance called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In further embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 105, directly on a hypervisor (in which case the unikernel is sometimes described as running within a LibOS virtual machine), or in a software container, embodiments can be implemented fully with unikernels running directly on a hypervisor represented by platform 103, unikernels running within software containers represented by instances 101, or as a combination of unikernels and the above-described techniques (e.g., unikernels and virtual machines both run directly on a hypervisor, unikernels and sets of applications that are run in different software containers).

While embodiments of the invention are illustrated with reference to containers 101, alternative embodiments may implement the processes and functions described herein at vary levels of granularity such as at a finer level granularity (e.g., line card virtual machines virtualize line cards, control card virtual machine virtualize control cards, etc.); it should be understood that the techniques described herein with reference to container instances also apply to embodiments where such a finer level of granularity and/or unikernels are used.

In certain embodiments, the platform includes a virtual switch that provides similar forwarding services as a physical Ethernet switch. Specifically, this virtual switch forwards traffic between containers 101 or instances and the NIC(s), as well as optionally between the containers 101 or instances; in addition, this virtual switch may enforce network isolation between the various components of the platform that by policy are not permitted to communicate with each other (e.g., by honoring virtual local area networks (VLANs)).

In some embodiments, hosts 1-N may communicate via a virtual network, which is a logical abstraction of a physical network that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

The platform 103, as discussed above, can include various components including a container manager 107, various APIs 121, an administrator interface 157, and similar components. This listing is not intended to be exhaustive, rather it sets forward those components most directly affected by the processes and embodiments described herein. These components can be spread across any combination of the hosts 1-N in any combination and permutation. Some components, such as the container manager 107 may have instances on each host, while others may be present in only a subset of the hosts.

The container manager 107 may be responsible for generating processes and jobs in the platform. The container manager 107 can facilitate the instantiation of applications and containers 101. As discussed further herein below, the container manager 107 may instantiate a container 101 or similar structure (e.g., unikernel or VM) by loading a corresponding container image 151 and its constituent sub units 153.

APIs 121 are sets of functions that applications, user (e.g., via an administrator interface 157 such as a command line interface, terminal or similar interface) and similar entities utilize to request resources of the platform including hardware 105. These functions, when invoked, are often referred to as 'calls' to the API. Some or all of these APIs can be considered secure APIs that require authentication of the requester before the requests are processed. The authentication is generally tied to a set of permissions or an authorization set of a user who has a set of user credentials that in turn can form or generate a user token. The user credentials or user token can be processed by an authentication server (not shown) to verify that the user credential or the user token are valid or authorized.

The platform can support any number of containers 101 distributed across any number of the hosts 1-N and in any distribution or organization of the containers 101. The containers can be fixed to a particular host or can be configured by the platform to be capable of being moved, for example for load balancing, across the set of hosts 1-N. The containers can have varying user space sizes, accessible resources and similar variations in characteristics.

In some embodiments, one or more of the hosts 1-N may store copies of the container images 151 in the local memory or storage 113. The container images 151 can be stored in any location accessible to a container manager 107 to enable the loading of these container images 151 to create a container 101.

In addition, the memory or storage 113 may include a secrets store 155. The secrets store 155 can include any sort of data that may be utilized during container instantiation to generate secret values to be injected to the container 101 or a sub unit of the container. The secrets store 155 can include lists of secret values, cryptographic information, or similar data that can either be used directly to inject a secret value defined by a secret sub unit into a container or can supply the information needed to derive such secret values such as hashing algorithm or similar function that generates values that can be utilized as secret values or as a portion thereof. In further embodiments, the principles, functions and processes described herein may be applied for other types of dynamic configuration of containers at runtime/instantiation. In such cases, the secrets store 155 may be a configuration store or similar data storage that contains any information relevant to a configuration or operation of a container that is dynamic (i.e., must be configured at runtime rather than during development) and/or instance specific.

Figure 2:
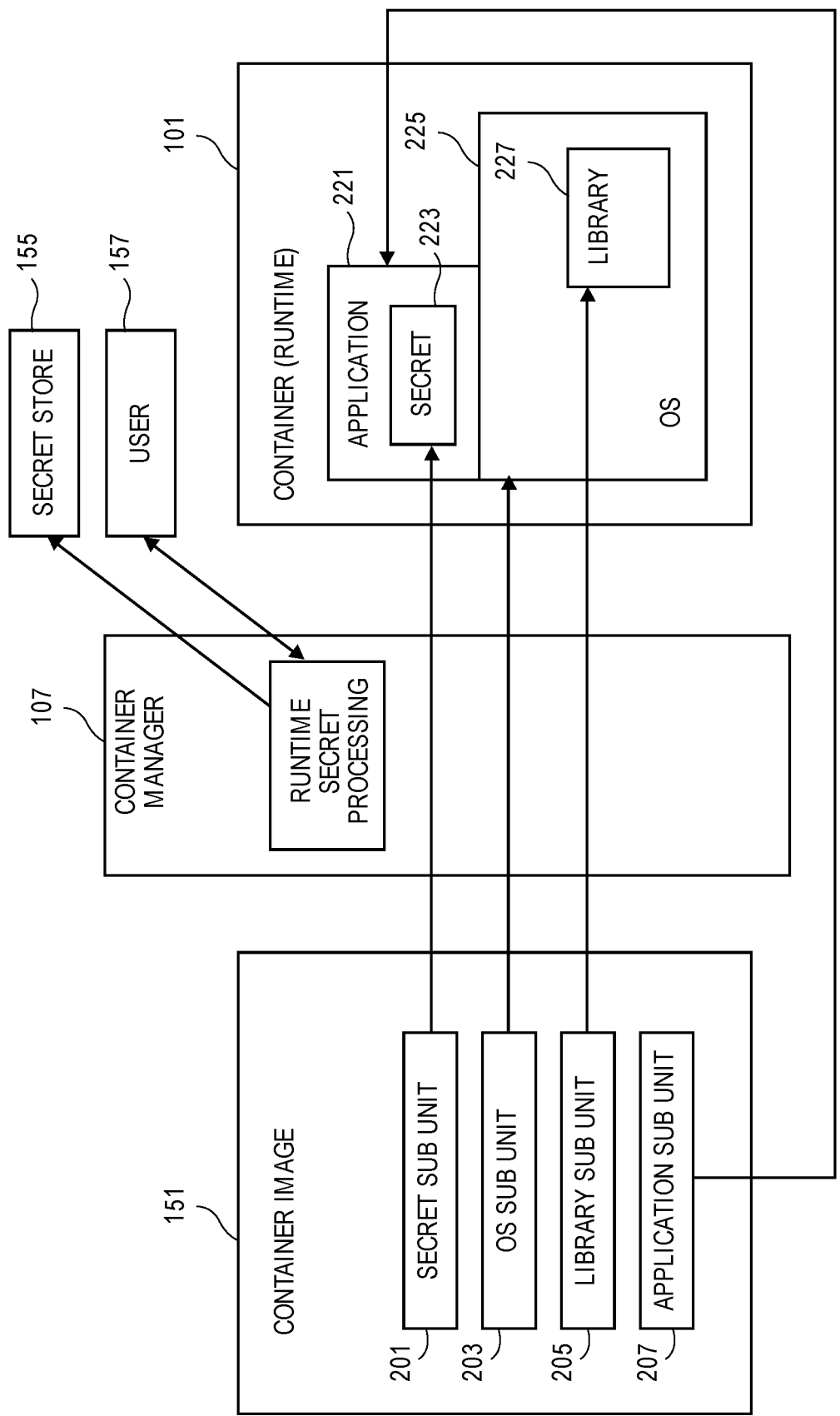
FIG. 2 is a diagram of one embodiment of a container image being processed to instantiate a container with a secrets sub unit.

FIG. 2 is a diagram of one embodiment of a process of generating a container from a container image. The process illustrates the manner in which a container manager 107 generates a container 101 to be executed by the platform from a container image 151. The container manager 107 may initiate the generation of a container 101 in response to a request from an administrator via an administrator interface 157 or via any similar process. A container image 151 is composed of any number of sub units. These sub units are either code or references to code that are loaded by the container manager 101 into a user space to be executed by the platform. The container manager 107 thus follows the 'recipe' defined by the container image 151 to create the container 101. Any number of containers 101 can be generated from a single container image 151. The embodiments enable each of these containers 101 generated from the same container image 151 to have different configuration (i.e., separate secret values or similar dynamic configuration at runtime). The types of sub units can include operating system (OS) sub units 203, library sub units 205, application sub unit 207 and secret (or dynamic configuration) sub unit 201. Any number, combination or sub set of sub units can be included in a given container image 151. The types of sub units described with reference to this example are by way of illustration and not limitation. One skilled in the art would appreciate that there may be any number of other types of sub units that may be defined in conjunction with a container image 151.

An OS sub unit 203 can include code or references to code related to an operating system or portion of an operating system such as a kernel. The OS sub unit 203 can similarly define or reference functions or interfaces of an operating system. A library sub unit 205 can define or reference a programming or code library in its entirety or any sub-set of the library as may be utilized by the container or the other components (sub-units) of the container 101. An application sub unit may define an application (i.e., a program or set of functions) to be executed as part of the container 101. A separate application sub unit may be defined for each application to be placed in the container or in some embodiments, multiple applications can be defined or referenced by a single application sub unit.

A secret sub unit 201 can define a set of secret information that is required by the container including secret information required by other sub units. In other embodiments, the secret sub unit 201 can define any dynamic runtime configuration information and can be referred to as a configuration sub unit. The secret sub unit 201 can have a standardized format that may specify a process for generating the required secret values, how to provide or input these secret values, the sub units utilizing the secret values and similar information. The secret sub units can be processed by a runtime secret processing component 211 in the container manager 107 or a similar component.

The runtime secret processing component 211 can access the metadata and information of the secret sub unit 201 and generate the secret values required as well as inject them into the container 101 or the container components such as an application 221 (shown with an injected secret 223 for example), the operating system 225 or component thereof, if present in the container, a library 227 or similar component of the container 101. In some embodiments, the container manager 107 and the runtime secret processing component 211 can retrieve secret related data from a secret store 155 where specified by a secret sub unit 201. Similarly, the secret sub unit 201 can define information that is to be input by a user/administrator and the runtime secret processing component 211 can interact with the administrator interface to query a user for the requisite information to generate the secret values to be injected into the container 101 or its components.

One skilled in the art would appreciate, that the same process and function can be applied to an embodiment where the secret sub unit 201 defines dynamic configuration requirements (i.e., where there is a configuration sub unit). The processes, components and functions described with relation to secret injection are also applicable and adaptable to dynamic runtime configuration of a container 101 and its components.

In one example embodiment, a secret sub unit may be defined in JavaScript Object Notation (JSON). This example is provided by way of illustration and not limitations. One skilled in the art would understand that the secret sub unit can be implemented with other formats and using other notations or languages.

```
secrets: {
  secret: {
    name: "TLS Key",
    type: "RSA_PRIVATE_KEY",
    format: "BASE64",
    destination: {
      type: "ENVIRONMENT VARIABLE",
      name: "TLS_KEY"
    }
    prompt: "Please enter the Base64-encoded server private key for TLS"
  },
  secret: {
    name: "DB Password",
    type: "Clear Text",
    format: "String",
    destination: {
      type: "file",
      name: "/usr/var/app/dbpwfile"
    }
    prompt: "Please enter the database password"
  }
```

In this example, a secret sub unit defines a set of secret values that are to be determined. For each secret value a 'name,' 'type,' 'format,' 'destination,' and 'prompt' are defined. The name of the first secret value is the 'TLS Key' and the second secret value name is the 'DB Password.' The first secret value type is 'RSA_Private_Key' (i.e., a cryptographic key) and the second is clear text. The first secret value type is 'Base64' (i.e., an ASCII encoding of the key) and the second is a string. The first and second secret values define a destination where each destination includes a type and name. The first and second secret values also define strings to be presented as prompts where the data to be obtained is from a user via an administrative input. In other embodiments, other fields can be defined such as input sources like secret stores or algorithms either by reference or explicitly within the secret sub unit.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 3:
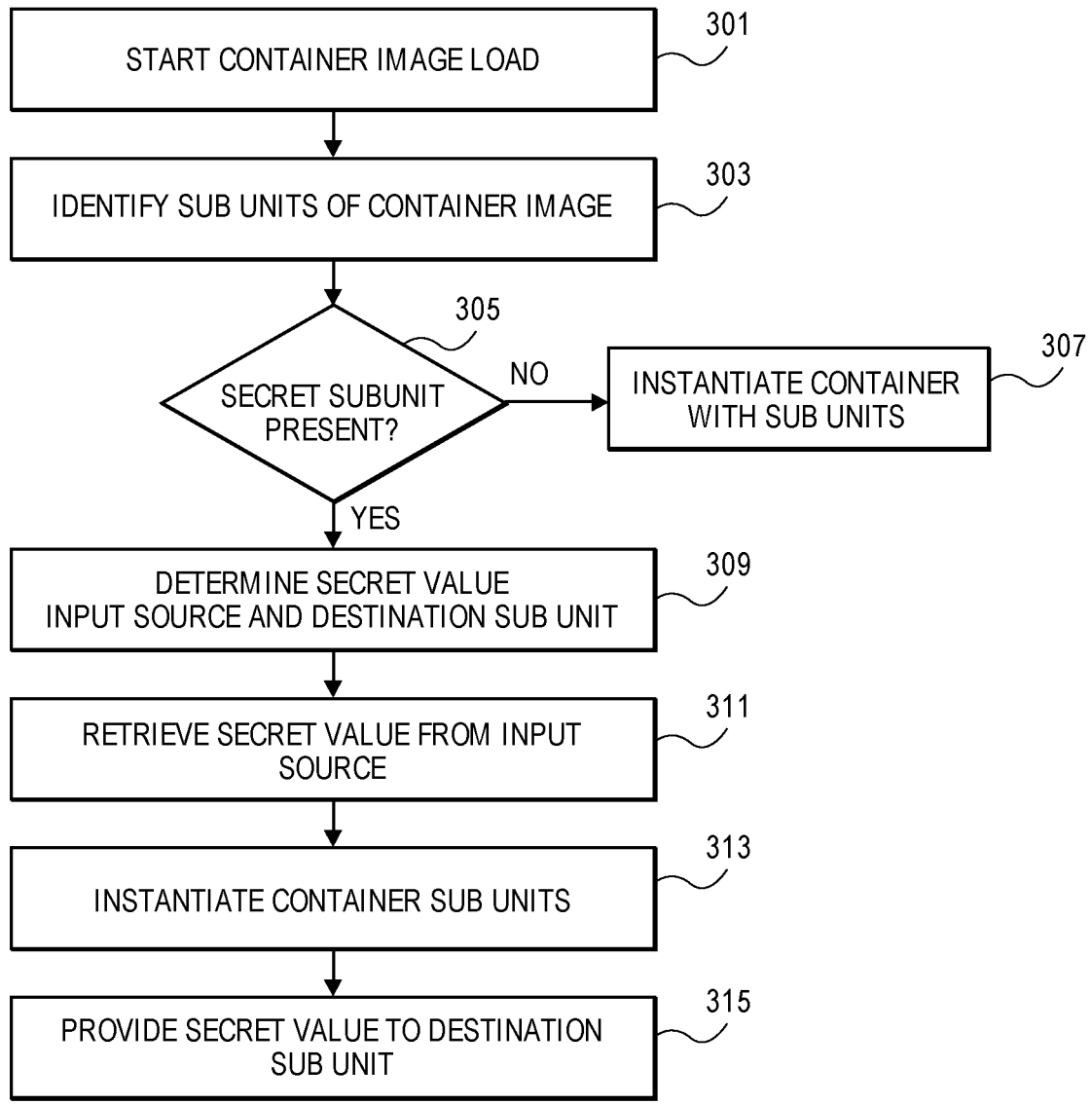
FIG. 3 is a flowchart of one embodiment of a process for container instantiation that supports secrets injection.

FIG. 3 is a process for runtime secret processing to support container instantiation from a container image. In some embodiments, this process is implemented by the container manager. In other embodiments, other components of the container management system or sub-components such as a runtime secret processing component may perform any number or arrangement of these functions. In on embodiment, the process is initiated in response to a request to instantiate a container and to load the associated container image (Block 301). The container image may be stored local to or remotely from the container manager. The container image may be stored in a single location or its storage may be distributed over any number of storage devices. Once the container image is loaded or as it is loaded, the process can identify the sub units that are a part of the container image. (Block 303). A given container image can have any number or variety of sub units (i.e., referred to as packages or layers in some implementations). The sub units can be loaded into a container or loaded to form a container on the container management system.

In some embodiments, a check is made to determine whether the set of sub units for a container to be instantiated include one or more secret sub units (or where the embodiments support dynamic configuration the sub units may be referred to as configuration sub units) (Block 305). If there are no secret (or configuration) sub units, then the process can continue with the instantiation of the container with the defined sub units (Block 307). If there are secret sub units, then the process may load the secret sub unit and access the meta data stored therein to determine a number and type of secret values (or configuration parameters) to be determined including the source of the secret values (configuration parameters) and the destination of the secret values (configuration parameters) (Block 309). For example, a secret sub unit may identify a secret store or similar storage location with a set of secret values or similar data to enable the derivation of the secret information. In other examples, a set of secret values may be defined to be determined based on a specified algorithm. The process then generates or retrieves the secret values from the sources (i.e., a storage location, derivation or similar process) (Block 311). In further embodiments, the determination of the secret values can include generation of a query or similar interaction with a user such as an administrator to receive some portion of the secret value or information to be utilized in the generation of the secret value such as a seed for a number generation algorithm. The process can use any combination of stored, user supplied or derived information to generate the secrets required by the secret sub unit.

Once the secret values have been determined in accord with the definition of the secret sub unit (or the dynamic configuration information has been similarly determined), then the process can complete the instantiation of the other container sub units (Block 313). In other embodiments, the other sub units can be loaded and/or instantiated in parallel or before the secret sub unit and secret value determination. The secret values can be provided to a target destination as defined by the secret sub unit (Block 315). The target can be any component or sub unit of the container being instantiated. The secret values can be provided by any communication mechanism such as via an inter-process communication, message, input parameter or similar mechanism for passing the secret information to the sub unit or similar component of a container.

In this manner, a secret sub unit can define a standardized method and format for determining secret values at run time and on a per instance basis. This process can be repeated for each instance of a container image that is being generated as a container thereby providing separate unique values to each container in the manner that is standardized for the container manager. This avoids differing approaches that may be defined entirely by developers that are not standardized and do not protect secrecy of the information on a per instance basis for each container.

Figure 4:
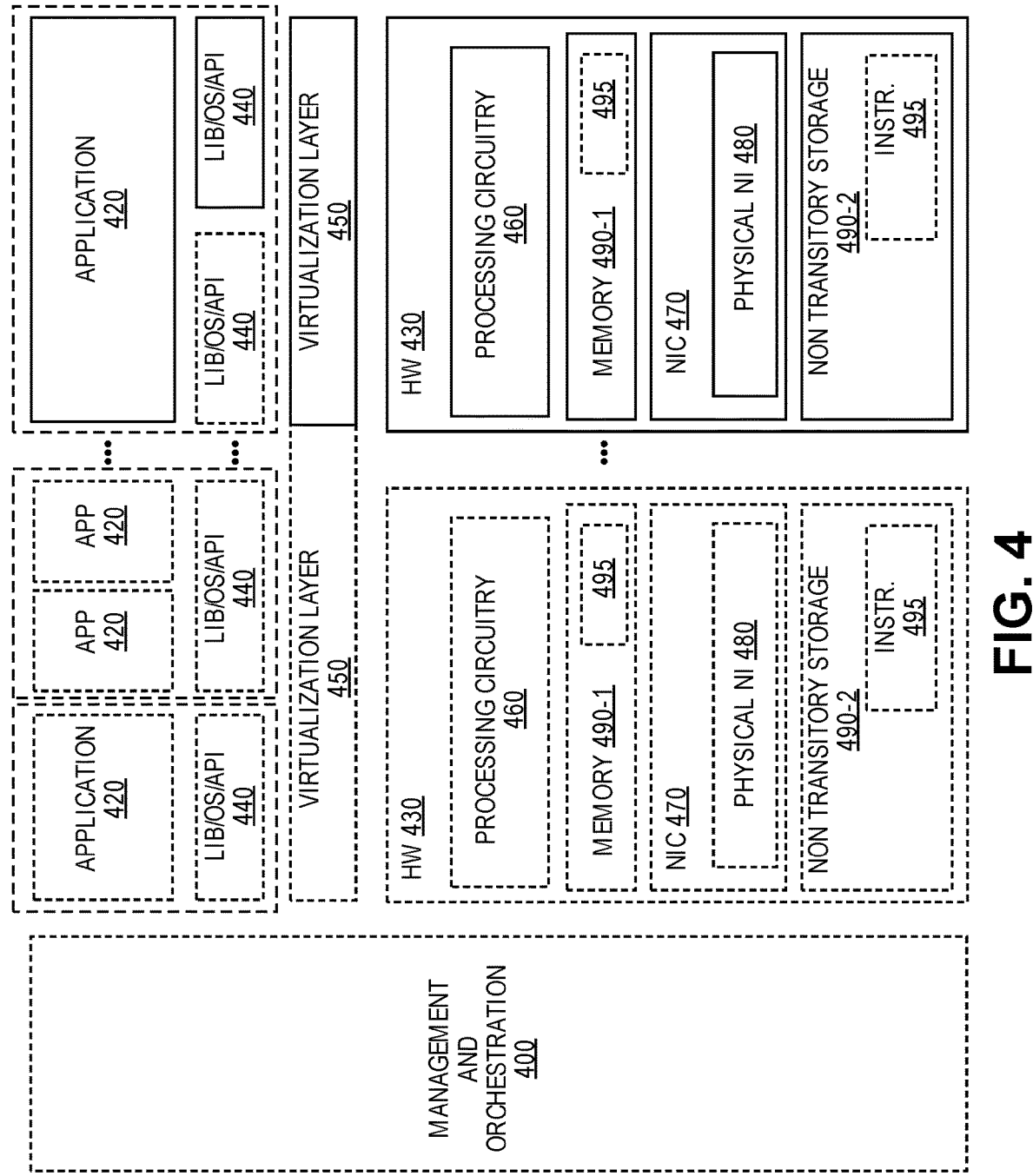
FIG. 4 is a diagram of one example of a virtualized operating environment for the embodiments.

FIG. 4 is a schematic block diagram illustrating a virtualization environment in which functions implemented by some embodiments may be virtualized. As discussed further herein above, in the present context, virtualizing means creating virtual versions of apparatuses or devices which may include virtualizing hardware platforms, storage devices and networking resources. As used herein, virtualization can be applied to provide a platform that executes over a set of physical hardware components and relates to an implementation in which at least a portion of the functionality is implemented as one or more virtual components (e.g., via one or more applications, components, functions, virtual machines or containers executing on one or more physical processing components).

In some embodiments, some or all of the functions described herein may be implemented as virtual components executed by one or more containers or virtual machines implemented in one or more virtual environments 4300 hosted by one or more of hardware components 4330.

The functions of the embodiments may be implemented as part of the virtualization layer 4350, which supports one or more applications 4320 (which may alternatively be called software instances, virtual appliances, network functions, virtual nodes, virtual network functions, or the like) operative to implement features, functions, and/or benefits of any type of program. Applications 4320 are run in virtualization environment 4300 such as containers which isolate the applications from hardware 4330 comprising processing circuitry 4360 and memory 4390. Memory 4390 contains instructions 4395 executable by processing circuitry 4360 whereby applications 4320 can be executed as part of the virtualization environment 4300.

The virtualization layer 4350 can be executed by general-purpose or special-purpose network hardware devices 4330 that may include a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may include one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Containers 4300 may include the applications 4320 and other sub units 4340, that support virtual processing, virtual memory, virtual networking or interface and virtual storage, and may be run by a corresponding virtualization layer 4350 or hypervisor. Different embodiments of the instances of applications 4320 may be implemented within one or more of virtual machines or containers 4300, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform or container management system.

As shown in FIG. 4, hardware 4330 may be a standalone network node with generic or specific components. Hardware 4330 may include any hardware components and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of managing dynamic runtime information provision for containers in a container management system, the method comprising:
    starting a container image load to instantiate a container;
    determining that a secret sub unit is present within the container image;
    determining an input source to provide a secret value for the container, the input source identified by information in the secret sub unit in the container image;
    determining a destination sub unit of the container to receive the secret value, the destination sub unit identified by information in the secret sub unit in the container image; and
    providing the secret value to the destination sub unit of the container.

2. The method of claim 1, further comprising:
    generating the secret value from information for determining the secret value retrieved from a secret store.

3. The method of claim 1, wherein the secret value is unique to the container.

4. The method of claim 1, wherein the secret value is a configuration parameter for the container.

5. The method of claim 1, wherein the secret value is derived from an algorithm defined by the secret sub unit.

6. The method of claim 1, wherein the secret sub unit includes meta data that defines a number and type of secret values to be determined for the container and the input source for the secret value.

7. The method of claim 1, further comprising:
    determining a plurality of secret values defined by the secret sub unit at container instantiation.

8. A computing device configured to implement a container management system, the container management system to support managing dynamic runtime information provision for containers, the computing device comprising:
    a non-transitory computer-readable medium having stored therein a container manager; and
    a processor coupled to the non-transitory computer-readable medium, the processor to execute the container manager, the container manager to start a container image load to instantiate a container, to determine that a secret sub unit is present within the container image, to determine an input source to provide a secret value for the container, the input source identified by information in the secret sub unit in the container image, determining a destination sub unit of the container to receive the secret value, the destination sub unit identified by information in the secret sub unit in the container image, and to provide the secret value to the destination sub unit of the container.

9. The computing device of claim 8, further comprising:
    a secret store coupled to the processor to store information for determining the secret value.

10. The computing device of claim 8, wherein the secret value is unique to the container.

11. The computing device of claim 8, wherein the secret value is a configuration parameter for the container.

12. The computing device of claim 8, wherein the secret value is derived from an algorithm defined by the secret sub unit.

13. The computing device of claim 8, wherein the secret sub unit includes meta data that defines a number and type of secret values to be determined for the container and the input source for the secret value.

14. A non-transitory computer readable medium having stored therein a set of instructions, which when executed cause a computing device to perform a set of operations to support dynamic runtime configuration of containers in a container management system, the set of operations comprising:
    starting a container image load to instantiate a container;
    determining that a secret sub unit is present within the container image;
    determining an input source to provide a secret value for the container, the input source identified by information in the secret sub unit in the container image;
    determining a destination sub unit of the container to receive the secret value, the destination sub unit identified by information in the secret sub unit in the container image; and
    providing the secret value to destination sub unit of the container.

15. The non-transitory computer readable medium of claim 14, further comprising:
   generating the secret value from information for determining the secret value retrieved from a secret store.

16. The non-transitory computer readable medium of claim 14, wherein the secret value is unique to the container.

17. The non-transitory computer readable medium of claim 14, wherein the secret value is a configuration parameter for the container.

18. The non-transitory computer readable medium of claim 14, wherein the secret source value is derived from an algorithm defined by the secret sub unit.

19. The non-transitory computer readable medium of claim 14, wherein the secret sub unit includes meta data that defines a number and type of secret values to be determined for the container and the input source for the secret value.

20. The non-transitory computer readable medium of claim 14, further comprising:
   determining a plurality of secret values defined by the secret sub unit at container instantiation.

* * * * *